(12) United States Patent
Van De Beek

(10) Patent No.: US 9,565,046 B2
(45) Date of Patent: Feb. 7, 2017

(54) METHODS AND NODES IN A WIRELESS COMMUNICATION NETWORK

(71) Applicant: Huawei Technologies Co., Ltd., Shenzhen, Guangdong (CN)

(72) Inventor: Jaap Van De Beek, Taby (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/880,938

(22) Filed: Oct. 12, 2015

(65) Prior Publication Data
US 2016/0036614 A1 Feb. 4, 2016

Related U.S. Application Data

(63) Continuation of application No. PCT/EP2013/057832, filed on Apr. 15, 2013.

(51) Int. Cl.
*H04B 7/06* (2006.01)
*H04L 27/26* (2006.01)
*H04L 25/03* (2006.01)

(52) U.S. Cl.
CPC ......... *H04L 27/2627* (2013.01); *H04B 7/0639* (2013.01); *H04L 25/03834* (2013.01)

(58) Field of Classification Search
CPC ........... H04L 27/2627; H04L 25/03834; H04B 7/0639
See application file for complete search history.

(56) References Cited

U.S. PATENT DOCUMENTS

| 2004/0022179 A1* | 2/2004 | Giannakis | H03M 13/29 370/207 |
| 2010/0027696 A1* | 2/2010 | Lee | H04B 7/0452 375/260 |
| 2011/0176474 A1* | 7/2011 | Saito | H04B 7/026 370/315 |
| 2013/0039235 A1 | 2/2013 | Rahman et al. | |
| 2013/0145239 A1* | 6/2013 | Pi | H04L 1/0003 714/807 |

FOREIGN PATENT DOCUMENTS

EP 2280496 A1 2/2011
WO WO 2011/009239 A1 1/2011

OTHER PUBLICATIONS

"3rd Generation Partnership Project; Technical Specification Group Radio Access Network; Evolved Universal Terrestrial Radio Access (E-UTRA); Physical Channels and Modulation (Release 8)", 3GPP TS 36.211 V8.4.0, Sep. 2008, 78 pages.

(Continued)

*Primary Examiner* — Vineeta Panwalkar

(57) ABSTRACT

A method and transmitter for generating a multicarrier signal, to be transmitted to a receiver, are provided. The method comprises dividing symbols to be transmitted into protected symbols and non-protected symbols; precoding non-protected symbols in a first precoder; precoding protected symbols in a second precoder; creating a modified non-protected symbol vector, based on the precoded non-protected symbols and the precoded protected symbols; and modulating the modified non-protected symbol vector and the protected symbols, thereby generating the multicarrier signal. Also, a method and receiver are disclosed.

22 Claims, 10 Drawing Sheets

(56) References Cited

OTHER PUBLICATIONS

Jaap van de Beek, et al., "EVM-constrained OFDM precoding for reduction of out-of-band emission", IEEE 2009, 5 pages.

Jaap van de Beek, et al., "N-continuous OFDM", IEEE Communications Letters, vol. 13, No. 1, Jan. 2009, 3 pages.

Jaap van de Beek, "Orthogonal Multiplexing in a Subspace of Frequency Well-Localized Signals", IEEE Communications Letters, vol. 14, No. 10, Oct. 2010, p. 882-884.

Jaap van de Beek, "Sculpting the Multicarrier Spectrum: A Novel Projection Precoder", IEEE Communications Letters, vol. 13, No. 12, Dec. 2009, p. 881-883.

\* cited by examiner

—△— Power spectrum of pilot-protecting spectral precoders
—○— Power spectrum of un-precoded OFDM signals — Power spectrum of pilot-protecting spectral precoders
— Power spectrum of un-precoded OFDM signals

METHODS AND NODES IN A WIRELESS COMMUNICATION NETWORK

CROSS-REFERENCE TO RELATED APPLICATIONS

This application is a continuation of International Application No. PCT/EP2013/057832, filed on Apr. 15, 2013, which is hereby incorporated by reference in its entirety.

TECHNICAL FIELD

Implementations described herein relate generally to a transmitter, a method in a transmitter, a receiver and a method in a receiver. In particular is herein described a mechanism for spectral shaping of multicarrier systems.

BACKGROUND

A User Equipment (UE), also known as a mobile station, wireless terminal and/or mobile terminal is enabled to communicate wirelessly in a wireless communication network, sometimes also referred to as a cellular radio system. The communication may be made, e.g., between UEs, between a UE and a wire connected telephone and/or between a UE and a server via a Radio Access Network (RAN) and possibly one or more core networks.

The wireless communication may comprise various communication services such as voice, messaging, packet data, video, broadcast, etc.

The UE may further be referred to as mobile telephone, cellular telephone, computer tablet or laptop with wireless capability, etc. The UE in the present context may be, for example, portable, pocket-storable, hand-held, computer-comprised, or vehicle-mounted mobile devices, enabled to communicate voice and/or data, via the radio access network, with another entity, such as another UE or a server.

The wireless communication network covers a geographical area which is divided into cell areas, with each cell area being served by a radio network node, or base station, e.g., a Radio Base Station (RBS), which in some networks may be referred to as "eNB", "eNodeB", "NodeB" or "B node", depending on the technology and terminology used.

Sometimes, the expression "cell" may be used for denoting the radio network node itself. However, the cell may also in normal terminology be used for the geographical area where radio coverage is provided by the radio network node at a base station site. One radio network node, situated on the base station site, may serve one or several cells. The radio network nodes may communicate over the air interface operating on radio frequencies with any UE within range of the respective radio network node.

In some radio access networks, several radio network nodes may be connected, e.g., by landlines or microwave, to a Radio Network Controller (RNC), e.g., in Universal Mobile Telecommunications System (UMTS). The RNC, also sometimes termed Base Station Controller (BSC), e.g., in GSM, may supervise and coordinate various activities of the plural radio network nodes connected thereto. GSM is an abbreviation for Global System for Mobile Communications (originally: Groupe Spécial Mobile).

In 3rd Generation Partnership Project (3GPP) Long Term Evolution (LTE) radio network nodes, which may be referred to as eNodeBs or eNBs, may be connected to a gateway, e.g., a radio access gateway, to one or more core networks.

In the present context, the expressions downlink, downstream link or forward link may be used for the transmission path from the radio network node to the UE. The expression uplink, upstream link or reverse link may be used for the transmission path in the opposite direction, i.e., from the UE to the radio network node.

Beyond 3G mobile communication systems, such as e.g., 3GPP LTE, offer high data rate in the downlink by employing Multiple-Input and Multiple-Output (MIMO) with Orthogonal Frequency Division Multiplexing (OFDM) access scheme at the UE.

A UE, before being able to receive downlink data from a serving radio network node, has to make a channel estimation. The channel estimation is based on a reference signal emitted by the radio network node. A number of reference signals have been defined in the LTE downlink, e.g., Cell-specific Reference Signal (CRS). CRS is transmitted in all subframes and in all resource blocks of the carrier.

In an effort to increase the flexibility of the radio network node's spectrum occupancy, various new waveforms have been proposed in the literature recently such as e.g. Filter Bank Multi-Carrier (FBMC) modulation, and/or precoded OFDM as notable examples. Typically, radio network nodes employing these waveforms distinguish themselves over today's established classical OFDM transmitters in that they move the functionality of prior art classical, low-pass spectrum-shaping transmitter-filters into the transmitter baseband modulator itself. By doing so, these radio network nodes combine extremely low out-of-band emission with a flexibility to rapidly change spectrum occupancy. By these virtues, they are considered very suitable for future radio systems that build on emerging concepts as dynamic, flexible spectrum access and spectrum sharing.

One such approach is based on precoding the data symbols prior to the OFDM modulation step typically in a K-point Discrete Fourier Transform (DFT).

FIG. 1A is illustrating an example of spectral precoding concept in a transmitter, which transmitter may be comprised in a radio network node for downlink transmission, or in a UE for uplink transmission. In each of the versions of this precoding approach as known in the prior art, data symbols are slightly corrupted for the sake of low out-of-band emissions. The symbols that modulate the subcarriers $\phi_k(t)$ of an OFDM symbol are collected in a vector $\bar{d}=[\bar{d}_0\ \bar{d}_1\ \bar{d}_2\ \ldots\ \bar{d}_{K-1}]^T$ and have the general form:

$$\bar{d}=Gd \quad\quad\quad \text{[Equation 1]}$$

where $\bar{d}=[\bar{d}_0\ \bar{d}_1\ \bar{d}_2\ \ldots\ \bar{d}_{D-1}]^T$ is the vector of D≤K information symbols and G is a K×D matrix denoting the spectral precoder. Further, the transmitted signal, generated by the K-point transmitter DFT is:

$$S(t)=\Sigma_k \bar{d}_k \phi_k(t) \quad\quad\quad \text{[Equation 2]}$$

where $\phi_k(t)$ are the K subcarriers used in the DFT modulator and $\phi_k(t)=e^{j2\pi ti(k)/T}$. Here, the index function i(k) maps each index in $\{0, 1, \ldots, K-1\}$ onto an arbitrary subcarrier index set $\{k_0, k_1, \ldots, k_{K-1}\}$. The index function i(k) may allow for an arbitrary order of the elements in the symbol vector $\bar{d}$.

A receiver may then detect the information symbols d either by using knowledge of the actual precoding operation at the transmitter, knowledge the receiver has through a standard specification or through a signalling channel; or by simply ignoring the transmitter precoding operation and rely on the fact that the distortion incurred at the transmitter is so small that the receiver-performance is not significantly deteriorated.

Essentially, the known precoders are determined by forcing the precoded symbols $\bar{d}$ to satisfy a set of M linear constraints collected in one matrix equation:

$$A\bar{d}=0 \qquad \text{[Equation 3]}$$

where A is the size M×K constraint matrix, embodying the M linear constraints. The matrix A is chosen in such a way that the out-of-band emission of the signal s(t) is small.

Two kinds of the constraint matrices A are known, one based on a time-domain continuity argument, i.e. N-continuous multicarrier. The other one is based on a spectrum notching argument. For the problem addressed here, the actual choice of particular prior-art choice of constraint matrix is irrelevant.

Further, the literature explicitly describes two kinds of precoding structures, one where D=K (resulting in a class of projection precoders), and one where D<K, resulting in a class of orthogonal precoders. In the former, the price for reduced out-of-band emission is paid in terms of a reduced error-rate performance at the receiver. In the latter the price is paid in the form of slightly reduced data-rate and a higher implementation complexity at both transmitter and receiver. For the problem addressed here, the actual choice of particular precoder structure is transparent.

In classical OFDM typically certain subcarriers are modulated by pre-defined pilot symbols known at the receiver. FIG. 1B illustrates how for instance pilot symbols are scattered among the information-carrying data symbols in the time-frequency grid. Depending on the operation mode, i.e. the number of deployed antennas by the transmitter, the signal for each transmit antenna carries pilots, also referred to as reference symbols, located on some standard-defined subcarriers that depend on the antenna-index (labelling the transmit-antennas) and also on a time index (labelling the 14 OFDM symbols in a timeslot-pair).

A receiver typically uses its knowledge of pilot symbols (besides the locations, the actual symbol-values are standard-defined and hence known at the receiver) to estimate how the radio channel has changed/affected the transmitted signal's phase and amplitude at the respective pilot positions in the time-frequency grid. In a second step, the receiver then typically interpolates these channel effects in order to estimate how the radio channel affects the transmitted signal at positions in the time-frequency-grid where data symbols are transmitted. This information is crucial for the reliable detection of the data symbols.

One problem with the precoding structure illustrated in FIG. 1A is that the precoder corrupts any OFDM pilot symbols, different from one symbol to another, and dependent on the information symbols transmitted on information-carrying subcarriers. This distortion appears in a way that is unpredictable by the receiver. Hence, a receiver channel estimation procedure would exhibit deteriorated performance, which, in turn, would lead to a degradation of the error-rate/throughput performance of the communication link.

Further, certain subcarriers may be subject to a backwards compatibility requirement in the sense that traditional OFDM receivers may perceive these subcarriers as if no precoding were applied in the transmitter. In a system with prior-art spectral precoding such backwards-compatible receivers would exhibit reduced performance because they operate as if no transmit-precoding is performed, and the actual transmit precoding appears as an additional signal distortion. For instance, in legacy systems, certain subcarriers may contain control signals, synchronization signals, broadcast channels, and/or basically any other reference signal in a system such as e.g. CSI-RS, DM-RS, PRS in LTE-terminology.

In addition, certain subcarriers may be used by the transmitter to transmit "side information" about the actual precoder used. If some knowledge about the transmit-precoder operation is not available to the receiver by other means e.g. through a standard-specification, or through a separate, other, communication channel, the multicarrier transmitter may convey this information on some subcarriers of the precoded signal itself. However, as also the subcarriers transmitting the side information concerning the used precoder are precoded, it is not possible for the receiver to decode the side information reliably.

In short, pre-coding of pilots or reference symbols render distortion of these signals which makes channel estimation at the receiver side difficult or even impossible.

Further, prior art precoding have problems with backward compatibility, as existing standards may not be capable of dealing with information symbols comprised in precoded signals.

In addition, information symbols carrying essential side information about the precoder cannot be detected reliably by the receiver, without the knowledge of the essential side information.

In a multi-antenna system this problem occurs on each antenna.

SUMMARY

It is therefore an object to obviate at least some of the above mentioned disadvantages and to improve the performance in a wireless communication network.

According to a first aspect, the object is achieved by a method in a transmitter. The transmitter is configured for generating a multicarrier signal to be transmitted to a receiver. The method comprises dividing symbols to be transmitted into protected symbols and non-protected symbols. Further, the method also comprises precoding non-protected symbols in a first precoder. Also, the method further comprises precoding protected symbols in a second precoder. In addition, the method also comprises creating a modified non-protected symbol vector, based on the precoded non-protected symbols and the precoded protected symbols. Furthermore, the method additionally comprises modulating the modified non-protected symbol vector and the protected symbols, thereby generating the multicarrier signal.

According to a second aspect, the object is achieved by a transmitter, configured for generating a multi-carrier signal. The transmitter comprises a processing circuit, configured for dividing symbols to be transmitted into protected symbols and non-protected symbols. Also, the processing circuit is further configured for also creating a modified non-protected symbol vector, based on the precoded non-protected symbols and the precoded protected symbols. Further, the transmitter in addition comprises a first precoder, configured for precoding non-protected symbols. In addition, the transmitter also comprises a second precoder, configured for precoding protected symbols. Furthermore, the transmitter comprises a multicarrier modulator, configured for modulating the modified non-protected symbol vector and the protected symbols, thereby generating the multicarrier signal to be transmitted.

According to a third aspect, the object is achieved by a method in a receiver. The receiver is configured for receiving a multicarrier signal generated and transmitted by a transmitter. The receiver method comprises receiving the multicarrier signal from the transmitter. Further, the method also comprises demodulating the received multicarrier signal into symbols. Also, the method further comprises dividing the demodulated symbols into protected symbols and non-protected symbols. Furthermore, the method in addition comprises retrieving information from the non-protected symbols in a detector, based on elements from a first precoder matrix $G_i$.

According to a fourth aspect, the object is achieved by a receiver. The receiver is configured for receiving a multicarrier signal generated and transmitted by a transmitter. The receiver comprises a receiving unit, configured for receiving the multicarrier signal from the transmitter. Further, the receiver also comprises a multicarrier demodulator, configured for demodulating the received multicarrier signal into symbols. The receiver, in furthermore addition comprises a processing circuit, configured for dividing the demodulated symbols into protected symbols and non-protected symbols. Finally the receiver also comprises a detector, configured for retrieving information from the non-protected symbols, based on elements from a first precoder matrix $G_i$.

A standard, off-the-shelf OFDM channel estimator in the receiver may carry out the channel estimation without performance reduction or complexity increase, which would occur if state-of-art spectral precoding were deployed. Alternatively, a precoded OFDM signal will be perceived at certain protected subcarriers as a classical non-precoded OFDM signal, allowing backwards compatible operation on these subcarriers. Finally, certain subcarriers may carry side information about the particular precoder used at the transmitter, and this side information may be reliable detected by a receiver without actual knowledge of the precoder used by the transmitter.

When the protected subcarriers carry pilot reference symbols, advantages thus comprise
1. Similar suppression of out-of-band power as in prior art solutions, while
2. Off-the-shelf low-complexity channel estimation algorithms may be deployed in a receiver.

When the protected subcarriers carry information symbols of legacy users, advantages thus comprise
1. Similar suppression of out-of-band power as in prior art solutions, while
2. Allowing the system to operate in a backwards-compatible mode on certain subcarriers.

When the protected subcarriers carry side-information, advantages thus comprise
1. Similar suppression of out-of-band power as in prior art solutions, while
2. Allowing the system to recover, at the receiver, the side information about the precoding operation, without having this knowledge already.

For a person skilled in the art, also combinations of the above use cases may be desirable: some subcarriers may be protected because they carry pilot symbols and other subcarriers would be protected because they carry side information, and yet other subcarriers may be protected because they carry data to legacy receivers.

Thereby an improved performance within the wireless communication network is provided.

Other objects, advantages and novel features of the embodiments of the invention will become apparent from the following detailed description.

BRIEF DESCRIPTION OF THE DRAWINGS

Embodiments of the invention are described in more detail with reference to attached drawings illustrating examples of embodiments in which.

DETAILED DESCRIPTION

Embodiments of the invention described herein are defined as a transmitter, a method in a transmitter, a receiver and a method in a receiver, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1A:
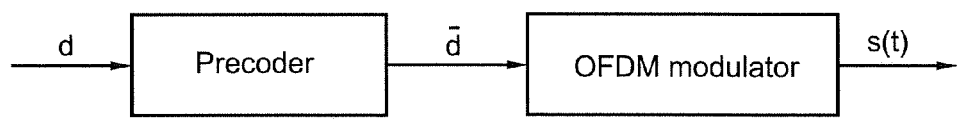
FIG. 1A is a block diagram illustrating precoding according to prior art.
Figure 1B:
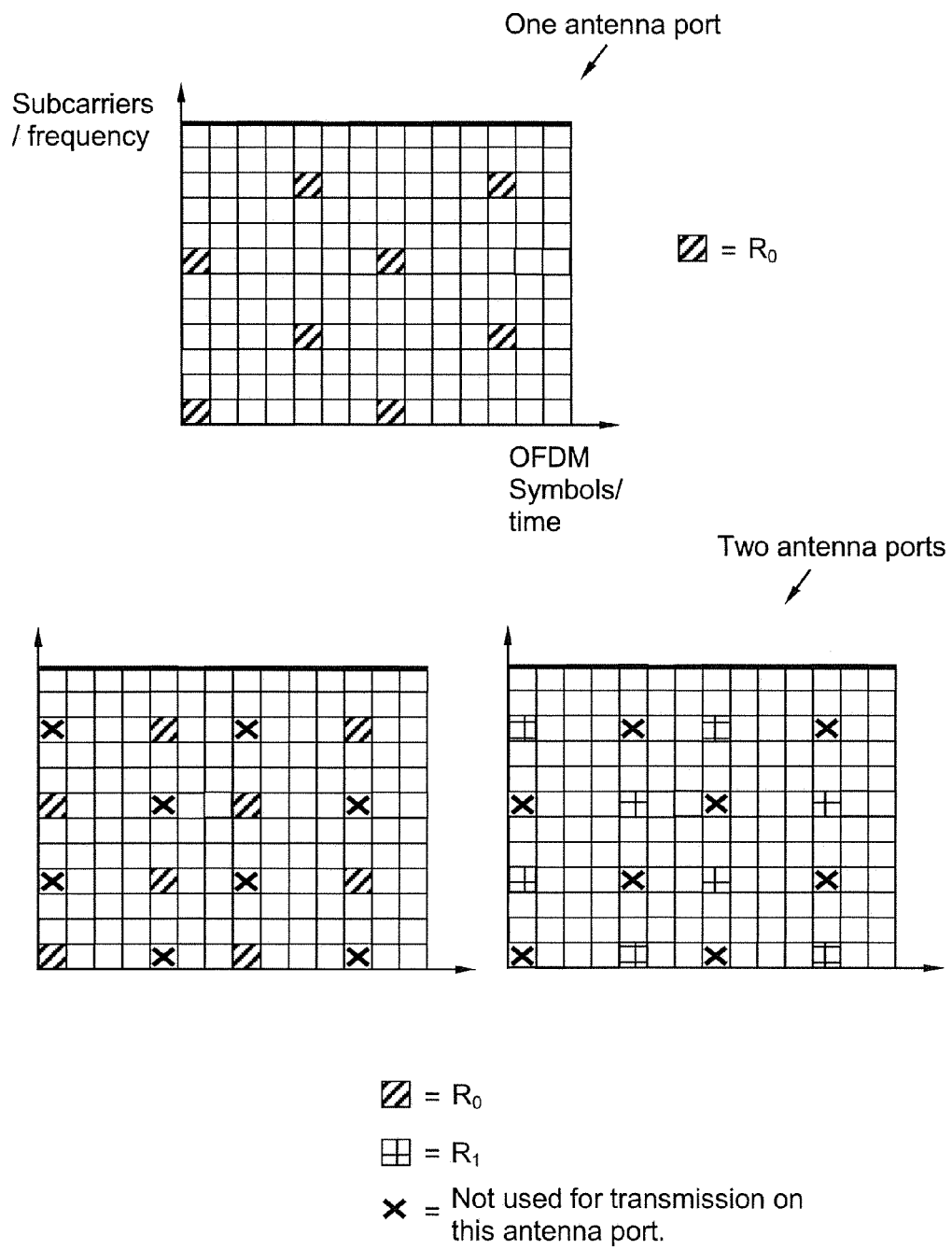
FIG. 1B is a block diagram illustrating pilot signal patterns according to prior art.
Figure 2:
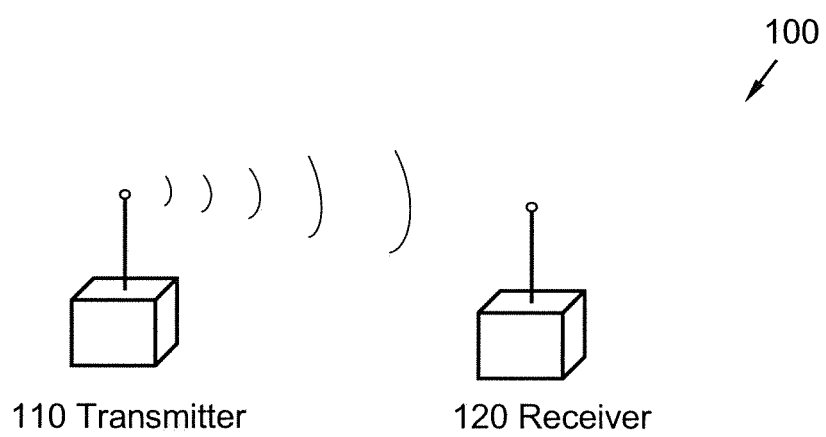
FIG. 2 is a block diagram illustrating a wireless communication network according to some embodiments.

FIG. 2 is a schematic illustration over a wireless communication network 100 comprising a transmitter 110 and a receiver 120. The transmitter 110 may be comprised in a radio network node, such as an eNodeB, while the receiver 120 may be comprised in a UE, according to some embodiments. However, in some embodiments the situation may be the opposite, such that the transmitter 110 may be comprised in a UE and the receiver 120 may be comprised in a radio network node, such as an eNodeB.

The wireless communication network 100 may at least partly be based on radio access technologies such as, e.g., 3GPP LTE, LTE-Advanced, Evolved Universal Terrestrial Radio Access Network (E-UTRAN), Universal Mobile Telecommunications System (UMTS), Global System for Mobile Communications (originally: Groupe Special Mobile) (GSM)/Enhanced Data rate for GSM Evolution (GSM/EDGE), Wideband Code Division Multiple Access (WCDMA), Time Division Multiple Access (TDMA) networks, Frequency Division Multiple Access (FDMA) networks, Orthogonal FDMA (OFDMA) networks, Single- Carrier FDMA (SC-FDMA) networks, Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 1×RTT and High Rate Packet Data (HRPD), just to mention some few options. The expressions "wireless communication network" and "wireless communication system" may within the technological context of this disclosure sometimes be utilised interchangeably.

The wireless communication network 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a Guard Period (GP) situated in the time domain between the uplink and downlink signalling. FDD means that the transmitter and receiver operate at different carrier frequencies.

The purpose of the illustration in FIG. 2 is to provide a simplified, general overview of the wireless communication network 100 and the involved methods and nodes, such as the transmitter 110 and receiver 120 herein described, and the functionalities involved. The methods, transmitter 110 and receiver 120 will subsequently, as a non-limiting example, be described in a 3GPP LTE/LTE-Advanced environment, but the embodiments of the disclosed methods, transmitter 110 and receiver 120 may operate in a wireless communication network 100 based on another access technology such as, e.g., any of the above already enumerated. Thus, although the embodiments of the invention are described based on, and using the lingo of, 3GPP LTE systems, it is by no means limited to 3GPP LTE.

The illustrated wireless communication network 100 comprises the transmitter 110, which may send radio signals to be received by the receiver 120.

The receiver 120 is configured to receive radio signals comprising information transmitted by the transmitter 110 in the downlink or in the uplink according to different embodiments.

It is to be noted that the illustrated network setting of one transmitter 110 and one receiver 120 in FIG. 2 is to be regarded as a non-limiting example of an embodiment only. The wireless communication network 100 may comprise any other number and/or combination of transmitters 110 and/or receivers 120. A plurality of receivers 120 and another configuration of transmitters 110 may thus be involved in some embodiments of the disclosed invention.

Thus whenever "one" or "a/an" receiver 120 and/or transmitter 110 is referred to in the present context, a plurality of receivers 120 and/or transmitters 110 may be involved, according to some embodiments.

The transmitter 110 may according to some embodiments be configured for downlink transmission and may be referred to, respectively, as e.g., a base station, NodeB, evolved Node Bs (eNB, or eNode B), base transceiver station, Access Point Base Station, base station router, Radio Base Station (RBS), micro base station, pico base station, femto base station, Home eNodeB, sensor, beacon device, relay node, repeater or any other network node configured for communication with the receiver 120 over a wireless interface, depending, e.g., of the radio access technology and terminology used. However, the transmitter 110 may according to some embodiments be configured for uplink transmission and may be referred to, a UE, a wireless communication terminal, a mobile cellular phone, a Personal Digital Assistant (PDA), a wireless platform, a mobile station, a tablet computer, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the receiver 120, according to different embodiments and different vocabulary.

The receiver 120 may correspondingly be represented by, e.g., a UE, a wireless communication terminal, a mobile cellular phone, a Personal Digital Assistant (PDA), a wireless platform, a mobile station, a tablet computer, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the transmitter 110, according to different embodiments and different vocabulary. However, the receiver 120 may according to some embodiments be referred to as e.g., a base station, NodeB, evolved Node Bs (eNB, or eNode B), base transceiver station, Access Point Base Station, base station router, Radio Base Station (RBS), micro base station, pico base station, femto base station, Home eNodeB, sensor, beacon device, relay node, repeater or any other network node configured for communication with the transmitter 110 over a wireless interface, depending, e.g., of the radio access technology and terminology used.

The invention disclosed herein describes a precoder structure comprising two features. On one hand, a group of subcarriers are excluded from any precoding (feature 1). Hence they are protected from any undesirable precoder corruption. Further on the other hand, the precoding of the remaining subcarriers optimally accounts for the presence of the known protected subcarriers and assures that optimal out-of-band suppression is accomplished (feature 2).

The precoder structure and a receiver structure will subsequently be explained in a geometrical perspective.

For the sake of notation, the modified symbol vector $\bar{d}$ comprising K symbols, is divided in two parts, the non-protected part $\bar{d}_i$ with K–P symbols and the protected part $\bar{d}_p$ with P symbols; thus: $\bar{d}=[\bar{d}_i\ \bar{d}_p]^T$.

Similarly, the symbol vector d with D≤K symbols may be separated in two parts, the non-protected part $d_i$ with D–P symbols and the protected part $d_p$ with P symbols, and the data symbols may be ordered in d such that $d=[d_i\ d_p]^T$.

It is required that the protected symbols are unaffected by the precoder, that is: $\bar{d}_p=d_p$. This requirement turns the precoder structure into:

$$\bar{d} = \begin{bmatrix} \bar{d}_i \\ \bar{d}_p \end{bmatrix} = \begin{bmatrix} \bar{d}_i \\ d_p \end{bmatrix} = \begin{bmatrix} G_i & G_p \\ 0_p & I_p \end{bmatrix}\begin{bmatrix} d_i \\ d_p \end{bmatrix} = Gd \quad \text{[Equation 4]}$$

which reveals the essential structure of the invention disclosed herein. Equation 4 essentially covers the features of the independent claims. Feature 1 above is covered by the fact that the precoding matrix G comprises a zero-matrix $0_p$ and an identity-matrix $I_p$, as its lower part—this implies that the protected subcarriers are unaffected by the precoder. Feature 2 is covered by the general form of the upper part of the matrix G, expressing that the modified data symbols on the non-protected subcarriers are in general a linear combination of all data symbols, both protected data, through $G_p$, and non-protected data, through $G_i$.

Just as in the prior art, it may be required that the symbol vector, after precoding, satisfies a set of linear constraints that guarantee that the FFT-modulated signal has low out-of-band emission either through time-domain N-continuity or by spectral notches. This requirement may turn into a set of linear equations:

$$A\bar{d} = 0 \text{ or } [A_i \; A_p]\begin{bmatrix} \bar{d}_i \\ d_p \end{bmatrix} = A_i\bar{d}_i + A_p d_p = 0 \quad \text{[Equation 5]}$$

where $A_i$ is a matrix containing the first K–P columns of A and $A_p$ is a matrix containing the last P columns of A. This mathematical expression essentially covers the feature of satisfying a set of M linear constraints, where P protected symbols and said K–P modified symbols jointly satisfy a set of M linear constraints such that the multicarrier signal's spectrum have low out-of-band emission.

The DFT modulator generates a multiplex s(t) comprising K subcarriers $\phi_k(t)$ (k=1, ..., K), P>0 of which are protected subcarriers. There are in total D data symbols, P of which are protected data symbols. The K modified symbols may have to satisfy M linear constraints, according to some embodiments in order to minimize or at least reduce out-of-band emission.

Any choice of scalars for which embodiments of the invention is applicable may thus satisfy: M<P+M≤D≤K.

Figure 3:
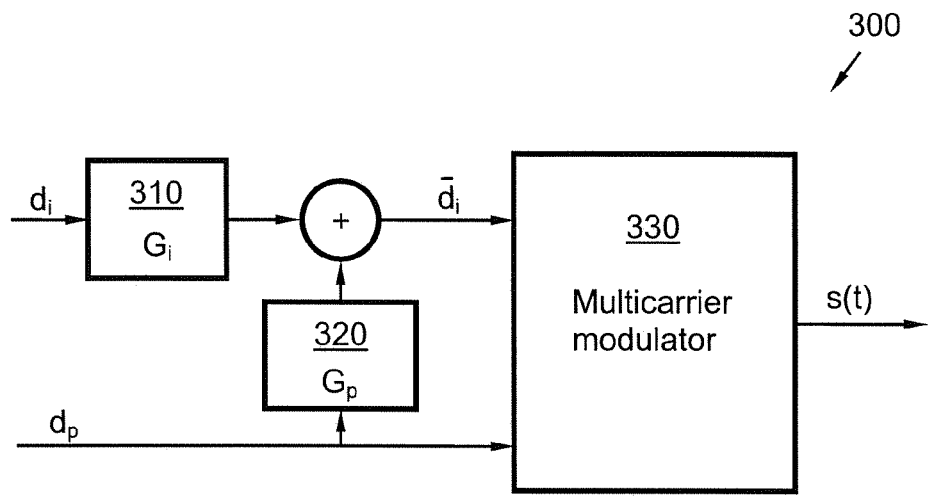
FIG. 3 is a block diagram illustrating a transmitter architecture according to an embodiment.

The size of the precoder matrix G is K–P×D and
The size of the precoder matrix $G_i$ is K–P×D–P
The size of the precoder matrix $G_p$ is K–P×P
The size of the all-zero matrix $0_p$ is P×D–P
The size of the identity matrix $I_p$ is P×P
The size of the modified symbol vector $\bar{d}$ is K×1 and
The size of the modified symbol vector $\bar{d}_i$ is K–P×1
The size of the modified protected symbol vector $\bar{d}_p$ is P×1
The size of the non-protected symbol vector d is D×1 and
The size of the non-protected symbol vector $d_i$ is D–P×1
The size of the protected symbol vector d is P×1
The size of the constraint matrix A is M×K and
The size of the constraint matrix $A_i$ is M×K–P
The size of the constraint matrix $A_p$ is M×P The precoder structure as disclosed according to some embodiments is shown in FIG. 3. Along with the illustrated precoder structure, some embodiments of the invention disclosed herein may require that $A_i\bar{d}_i + A_p d_p = 0$, where $A_i$ and $A_p$ are partitions of a constraint matrix $A=[A_i \; A_p]$.

In FIG. 3 is thus disclosed a system 300 for generating a multicarrier signal s(t) to be transmitted to the receiver 120. The system 300 comprises a first precoder 310, a second precoder 320 and a multicarrier modulator 330.

The operation of $G_i$ on the information symbols in the first precoder 310 is described in the literature without the presence of other subcarriers that need protection. However, the additional operation of $G_p$ on the pilot symbols in the second precoder 320, in order to compensate for their presence in the aggregate signal s(t) is unknown in prior art.

In some embodiments, the number D–P of elements in $d_i$ are the same as the number K–P of elements in $\bar{d}_i$, that is, D=K. As a result the precoder matrix $G_i$ in equation 4 may comprise a square matrix (size (K–P)×(K–P)). In an embodiment of the invention, the closed-form precoder matrix pair $G_i$ and $G_p$, disclosed here may be:

$$G_i = I_{K-P} - A_i^H(A_i A_i^H)^{-1} A_i \quad \text{[Equation 6]}$$

$$G_p = A_i^H(A_i A_i^H)^{-1} A_p \quad \text{[Equation 7]}$$

Again, here, the precoder part $G_i$ may have a shape, known from the prior art, whereas the contribution of $G_p$ is unknown in prior art.

A proof of the equations 6-7 and that they are optimal in least-squares sense will subsequently be presented.

Here will be developed the closed-form solution expressions for $G_i$ and $G_p$ in equation 4 that satisfy equation 5 in detail, and which yield the shortest error $\|\bar{d}-d\|_2^2 = \|\bar{d}_i - d_i\|_2^2$ (Eucledian norm). The disclosed precoding is the optimal solution to:

$$\bar{d}_i = \arg\min_{\tilde{d}_i} \|\tilde{d}_i - d_i\|_2^2 \text{ subject to } A_i\tilde{d}_i + A_p d_p = 0 \quad \text{[Equation 8]}$$

that is, it is the particular solution that closest to the original data vector d as possible, while satisfying the constraints of equation 5. This is a classical constrained least-squares problem, which may be solved here along lines known from the literature, by Lagrange multiplication. The equation 8 may be rewritten as:

$$\bar{d}_i = \arg\min_{\tilde{d}_i} J(\tilde{d}_i) \quad \text{[Equation 9]}$$

where:

$$J(\tilde{d}_i) = \tfrac{1}{2}\|\tilde{d}_i - d_i\|_2^2 + (A_i \tilde{d}_i + A_p d_p)^H \lambda. \quad \text{[Equation 10]}$$

By solving $\partial J/\partial \tilde{d}_i = 0$, it is found that $$\bar{d}_i = d_i + A_i^H \lambda. \quad \text{[Equation 11]}$$

Applying the constraint in equations 8-11 it is found that $$\lambda = -(A_i A_i^H)^{-1}(A_i d_i + A_p d_p), \quad \text{[Equation 12]}$$

and the solution to equation 9 becomes $$\bar{d}_i = G_i d_i + G_p d_p, \quad \text{[Equation 13]}$$

where $G_i$ and $G_p$ are as defined in equation 6 and 7. It is then verified (since $A_i G_i = 0$ and $A_i G_p = -A_p$) that the constraint of equation 5 is satisfied:

$$A\bar{d} = [A_i \; A_p]\begin{bmatrix} G_i & G_p \\ 0_p & I \end{bmatrix}\begin{bmatrix} d_i \\ d_p \end{bmatrix} = \quad \text{[Equation 14]}$$

$$A_i G_i d_i + A_i G_p d_p + A_p d_p = 0$$

and hence the spectral constraints are satisfied.

Figure 4A:
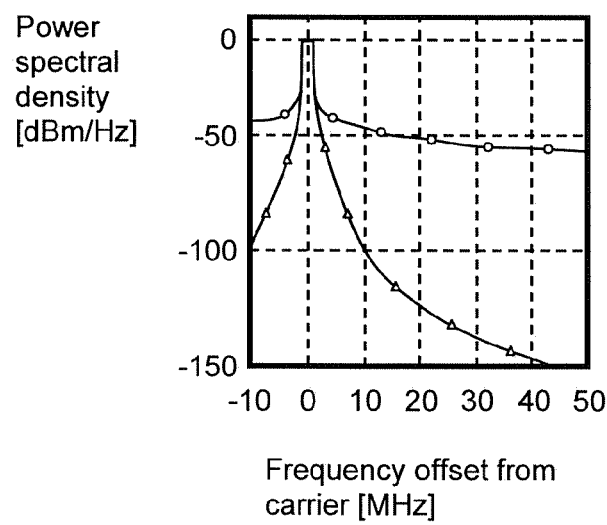
FIG. 4A is a diagram illustrating power spectrum according to an embodiment of the invention.
Figure 4B:
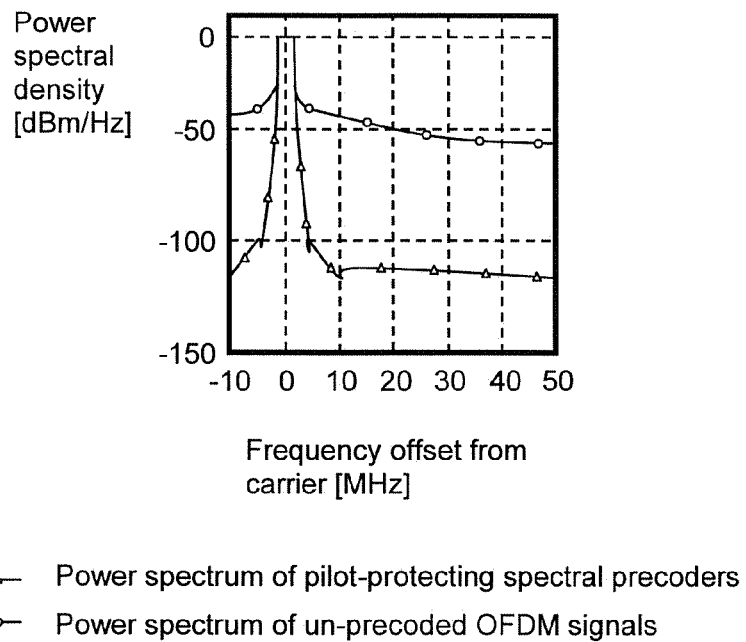
FIG. 4B is a diagram illustrating power spectrum according to an embodiment of the invention.

FIG. 4A and FIG. 4B illustrate the power spectra of two OFDM signals along with the power spectrum of OFDM without precoding. FIG. 4A illustrates power spectrum of pilot-protecting spectral precoders (marked with triangles) compared to un-precoded OFDM signals (marked with circles), comprising precoded N-continuous OFDM. FIG. 4B illustrates power spectrum of pilot-protecting spectral precoders (marked with triangles) compared to un-precoded OFDM signals (marked with circles), comprising precoded notched OFDM.

Another transmitter embodiment, on the concept of orthogonal precoders for D=K–M will subsequently be described. In this embodiment, the number of elements in $d_i$ may be D=K–M<K, where M is the number of constraints represented by the matrix A in equation 5 (M is the number of rows in A). Hence, the precoder matrix $G_i$ in equation 4 is not square: its size may be (K–P)×(K–P–M). The precoder matrix $G_i$ in this embodiment of the invention is $$G_i = [v_0 v_1 \ldots v_{D-P-1}] \quad \text{[Equation 15]}$$

where the D–P constituting column vectors $v_i$ of $G_i$ span the nullspace of $A_i$ (the nullspace constitutes all vectors x for which $A_i x = 0$).

For instance, one choice of such columns is based on the unique singular-value decomposition of the size—M×(K−P) constraint matrix $A_i$ $$A_i = U_i \Sigma_i V_i \qquad [\text{Equation 16}]$$

where $U_i$ is a size—M×M matrix, $\Sigma_i$ is a diagonal size—M×(K−P) matrix, and $V_i$ is a size—(K−P)×(K−P) matrix. The last K−P−M (=D−P) columns of $V_i$ may constitute an orthogonal basis of the nullspace of $A_i$ as specified above in equation 15, and hence, they may be chosen to form the precoder matrix $G_i$. According to this, the matrix $G_i$ in equation 13 is then chosen as the last D−P columns of $V_i$ in equation 16;

$$G_i = [v_{K-P-(D-P)} v_{K-P-(D-P-1)} \ldots v_{K-P-1}] \qquad [\text{Equation 17}]$$

which, is equivalent to simply ignoring the first M columns of $v_i$, $[v_0\ v_1\ \ldots\ v_{M-1}]$, to obtain the precoder matrix $G_i$ from $V_i$ in equation 16, $$G_i = [v_M v_{M+1} \ldots v_{K-P-1}]. \qquad [\text{Equation 18}]$$

Figure 5A:
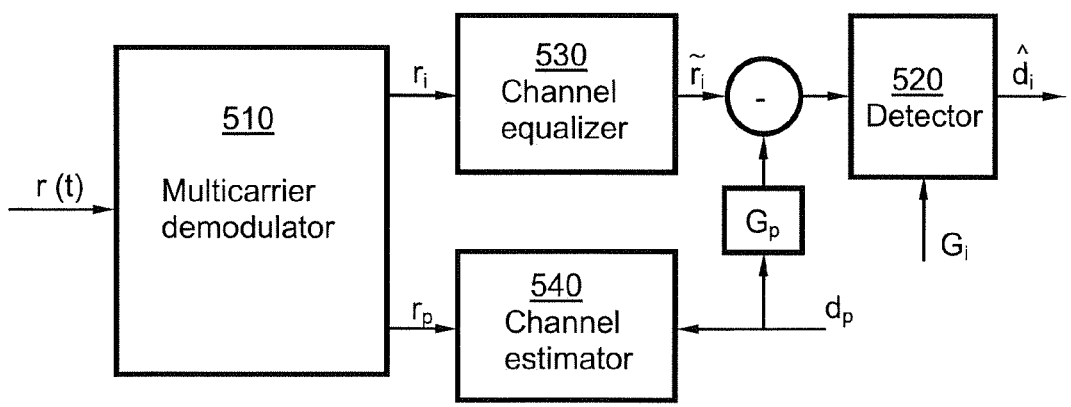
FIG. 5A is a block diagram illustrating an embodiment of a receiver architecture.
Figure 5B:
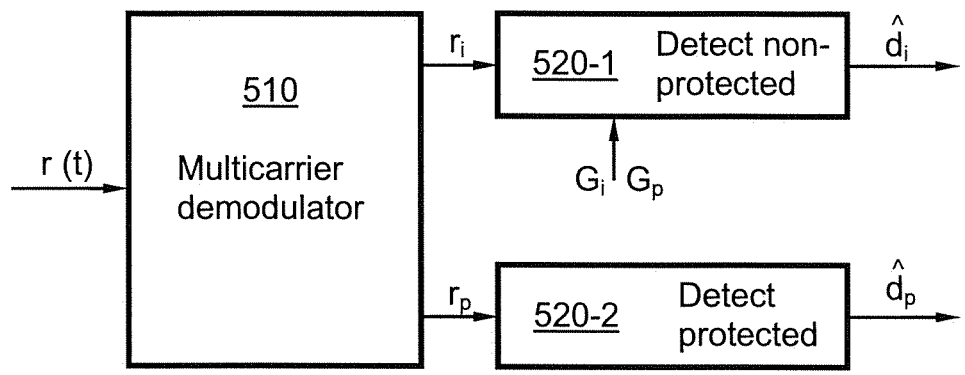
FIG. 5B is a block diagram illustrating an embodiment of a receiver architecture.
Figure 5C:
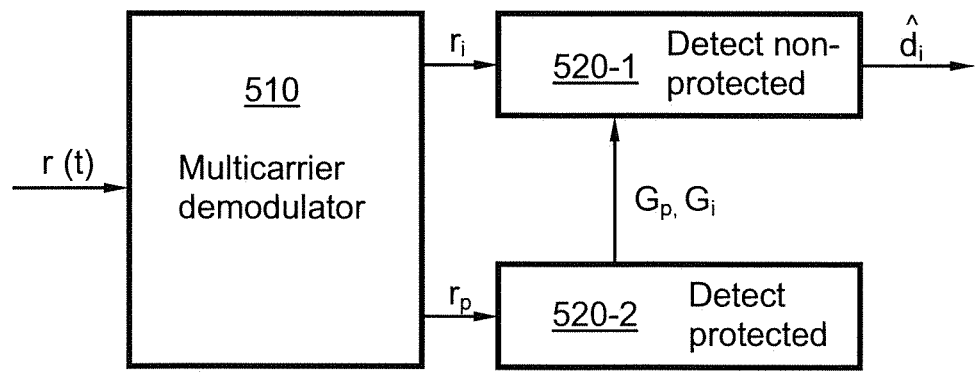
FIG. 5C is a block diagram illustrating an embodiment of a receiver architecture.

FIG. 5A, FIG. 5B and FIG. 5C disclose embodiments of the receiver 120.

FIG. 5A disclose a receiver structure according to an embodiment, comprising a multicarrier demodulator 510, a detector 520, a channel equalizer 530 and a channel estimator 540. In the case where the protected symbols represent pilot or reference symbols, the receiver 120 may comprise the structure as shown in FIG. 5A, according to some embodiments. After a standard multicarrier demodulation step, the channel estimation and equalization may be carried out in a simple, straightforward, traditional fashion, without any knowledge of the precoder matrices $G_p$ and/or $G_i$. The precoder knowledge may instead be used in the detection stage of the receiver 120, where first the contribution of the protected pilots through $G_p$ is subtracted, after which a detector retrieves the information symbols possibly using knowledge of the transmitter precoder $G_i$.

In particular, the receiver processing i.e. subtraction, based on $G_p$ makes it possible to decode the received multicarrier signal by compensation of the protected symbols. It is thereby possible to receive pilot symbols and/or reference symbols which have not been precoded by the transmitter 110, and also receive non-protected symbols comprising information, which has been precoded by the transmitter 110.

FIG. 5B disclose a receiver structure according to an embodiment, comprising a multicarrier demodulator 510, a first detector 520-1 and a second detector 520-2.

According to some embodiments, the protected symbols may represent information symbols. The receiver 120 may be a legacy receiver 120 that has not the capability to reliably detect precoded information as the embodiment illustrated in FIG. 5A. The disclosed embodiment comprises two detectors 520-1, 520-2 in the receiver 120; one operating on the protected subcarriers (without any knowledge of the precoders) and one operating on the non-protected, precoded subcarriers, possibly using knowledge of the precoding matrices $G_p$ and $G_i$, according to some embodiments.

Figure 5c illustrates yet an embodiment of the receiver 120. In case where the protected symbols represent essential side information about the precoder, and/or precoding matrices $G_p$ and/or $G_i$, the receiver 120 may have the structure as shown in Figure 5c.

Also this embodiment of the receiver 120 may comprise two detectors 520-1, 520-2; one operating on the protected subcarriers, configured for extracting the essential side information, and one operating on the non-protected, precoded subcarriers possibly using the side information provided by the first detector 520-1.

Side information may comprise the precoder matrices $G_p$ and/or $G_i$, or pointers to these in a lookup table, or parameters that allow the receiver 120 to deduce the matrices $G_p$ and/or $G_i$. This may be required in for instance downlink cases where one receiver 120 does not know which are the actual unprotected symbols, or where one receiver 120 does not know which are the actual protected symbols. In either of these cases the receiver 120 must be informed about the actual precoder being used by the transmitter 110. The information of which subcarriers are protected and non-protected are incorporated in the choice of the precoder.

Figure 6:
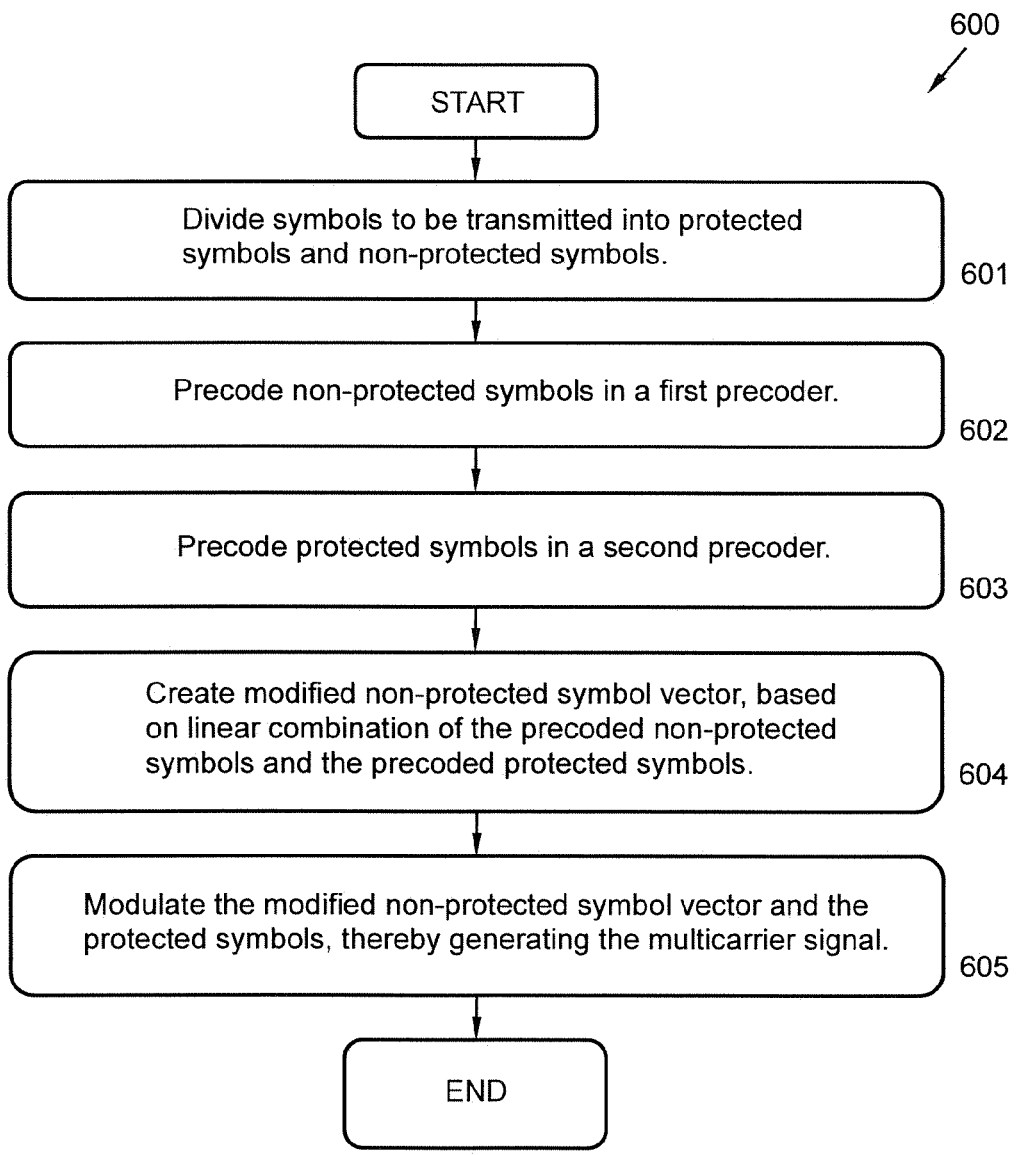
FIG. 6 is a flow chart illustrating a method in a transmitter according to an embodiment of the invention.

FIG. 6 is a flow chart illustrating embodiments of a method 600 in a transmitter 110, for generating a multicarrier signal to be transmitted to a receiver 120. The transmitter 110 may be comprised in a wireless communication network 100, which may be based on 3rd Generation Partnership Project Long Term Evolution (3GPP LTE). The receiver 120 may be a User Equipment (UE), or alternatively comprise a radio network node such as an evolved NodeB (eNodeB) according to some embodiments. The transmitter 110 may comprise a radio network node such as an eNodeB according to some embodiments, or alternatively a UE.

To appropriately generate the multicarrier signal to be transmitted, the method 600 may comprise a number of actions 601-605.

It is however to be noted that any, some or all of the described actions 601-605, may be performed in a somewhat different chronological order than the enumeration indicates, or even be performed simultaneously. Some actions such as e.g. 602 and 603 may be performed in reversed order, or simultaneously according to different embodiments. Further, it is to be noted that some actions such as e.g. action 604 may be performed in a plurality of alternative manners according to different embodiments. The method 600 may comprise the following actions:

Action 601

Symbols to be transmitted are divided into protected symbols and non-protected symbols.

A symbol may comprise a complex value.

The protected symbols to be transmitted may comprise any of: a pilot signal or a reference symbol; an information symbol to be transmitted to a legacy receiver and/or an information symbol carrying side information relating to the precoding, according to different embodiments.

Action 602

Non-protected symbols are precoded in a first precoder 310.

The precoding of non-protected symbols in the first precoder 310 may be made by a first precoder matrix $G_i$, according to some embodiments. The matrix $G_i$ may in some embodiments have the form: $G_i = I - A_i^H (A_i A_i^H)^{-1} A_i$.

However, in some embodiments, the matrix $G_i$ may have the form:

$$G_i = [v_0 V_1 \ldots v_{D-P-1}],$$

where the constituting column vectors $v_i$ of said weight matrix $G_i$ span the nullspace of the matrix $A_i$, comprising all vectors x for which $A_i x = 0$.

In some such embodiments, said constituting column vectors $v_i$ of said weight matrix $G_i$ may comprise the last columns of the size matrix $V_i$ in the unique singular-value decomposition of the constraint matrix $A_i$: $A_i = U_i \Sigma_i V_i$.

Action 603

Protected symbols are precoded in a second precoder 320.

The precoding of protected symbols in the second precoder 320 is made by a second precoder matrix $G_p$, which matrices $G_p$ and the previously mentioned $G_i$, may be selected so that the multicarrier signal is generated with a spectrum having an out-of-band emission below a predetermined threshold level, according to some embodiments.

According to some embodiments, the matrix $G_p$ may have the form:

$$G_p = -A_i^H (A_i A_i^H)^{-1} A_p.$$

In some embodiments, the protected symbols collected in a protected symbol vector $d_p$ may be chosen such that they satisfy the set of linear constraints: $A_p d_p = 0$.

Further, according to some embodiments, the matrix $G_p$ may comprise the zero matrix: $G_p = 0$.

Action 604

A modified non-protected symbol vector is created, based on the precoded 602 non-protected symbols and the precoded 603 protected symbols.

According to some embodiments, the first precoder 310 and second precoder 320 may be chosen such that:

$$A_i \bar{d}_i + A_p d_p = 0,$$

where $\bar{d}_i$ denotes said modified non-protected symbol vector, $d_p$ denotes a protected symbol vector, and where $A_i$ and $A_p$ are constraint matrices.

According to some embodiments, the modified non-protected symbol vector may be created by linear combination of said symbols, on the form:

$$\bar{d}_i = G_i d_i + G_p d_p,$$

where $d_i$ denotes a non-protected symbol vector, and $G_i$ and $G_p$ are matrices.

Action 605

The modified 604 non-protected symbol vector and the protected symbols are modulated, thereby generating the multicarrier signal.

Figure 7:
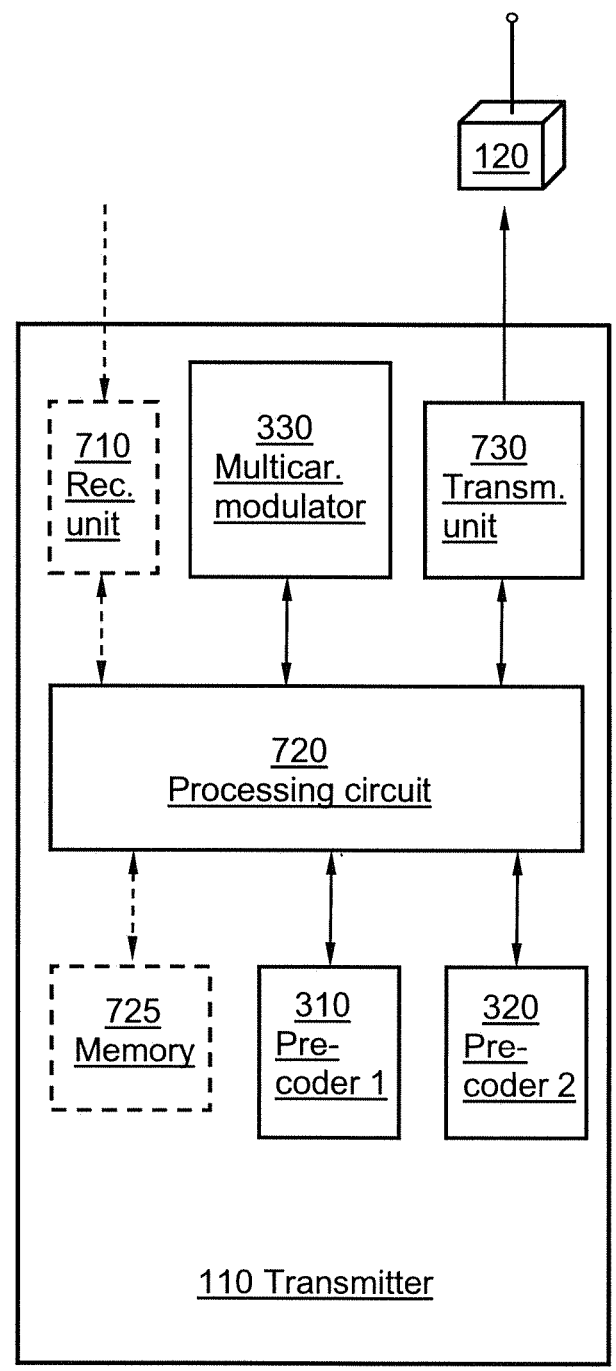
FIG. 7 is a block diagram illustrating a transmitter according to an embodiment of the invention.

FIG. 7 is a block diagram illustrating a transmitter 110 in a wireless communication network 100. The transmitter 110 is configured for transmitting wireless signals within the wireless communication network 100, to be received by a receiver 120.

Further, the transmitter 110 is configured for performing the above mentioned method 600 according to any, some or all of the actions 601-605 for generating a multicarrier signal to be transmitted wirelessly to a receiver 120.

The wireless communication network 100 may be based on 3GPP LTE. The receiver 120 may be a UE, or alternatively comprise a radio network node such as an eNodeB according to some embodiments. The transmitter 110 may comprise a radio network node such as an eNodeB according to some embodiments, or alternatively a UE.

For enhanced clarity, any internal electronics or other components of the transmitter 110, not completely indispensable for understanding the herein described embodiments have been omitted from FIG. 7.

The transmitter 110 comprises a processing circuit 720. The processing circuit 720 is configured for dividing symbols to be transmitted into protected symbols and non-protected symbols. The processing circuit 720 is also configured for creating a modified non-protected symbol vector, based on the precoded non-protected symbols and the precoded protected symbols.

The transmitter 110 also comprises a first precoder 310, configured for precoding non-protected symbols.

Further, the transmitter 110 in addition comprises a second precoder 320, configured for precoding protected symbols.

In addition, the transmitter 110 furthermore comprises a multicarrier modulator 330, configured for modulating the modified non-protected symbol vector and the protected symbols, thereby generating the multicarrier signal to be transmitted.

The processing circuit 720 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The herein utilised expression "processing circuit" may thus represent a processing circuitry comprising a plurality of processing circuits, such as, e.g., any, some or all of the ones enumerated above.

The processing circuit 720 may further perform data processing functions for inputting, outputting, and processing of data comprising data buffering and device control functions, such as call processing control, user interface control, or the like.

Additionally, the transmitter 110 may also comprise a transmitting unit 730, configured for transmitting the generated multicarrier signal.

Furthermore, the transmitter 110 may comprise at least one memory 725, according to some embodiments. The memory 725 may comprise a physical device utilised to store data or programs, i.e., sequences of instructions, on a temporary or permanent basis. According to some embodiments, the memory 725 may comprise integrated circuits comprising silicon-based transistors. Further, the memory 725 may be volatile or non-volatile.

In further addition, the transmitter 110 may also comprise a receiving unit 710. The receiving unit 710 may be configured for receiving wireless signals transmitted within the wireless communication networks 100, according to some embodiments.

The previously described actions 601-605 to be performed in the transmitter 110 may be implemented through the one or more processing circuits 720 in the transmitter 110, together with computer program code for performing the functions of the actions 601-605. Thus a computer program product, comprising instructions for performing the actions 601-605 in the transmitter 110 may perform the method 600 for generating a multicarrier signal to be transmitted to a receiver 120, when the computer program product is loaded in a processing circuit 720 of the transmitter 110.

The computer program product mentioned above may be provided for instance in the form of a data carrier carrying computer program code for performing any, at least some, or all of the actions 601-605 according to some embodiments when being loaded into the processing circuit 720. The data carrier may be, e.g., a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the transmitter 110 remotely, e.g., over an Internet or an intranet connection.

Figure 8:
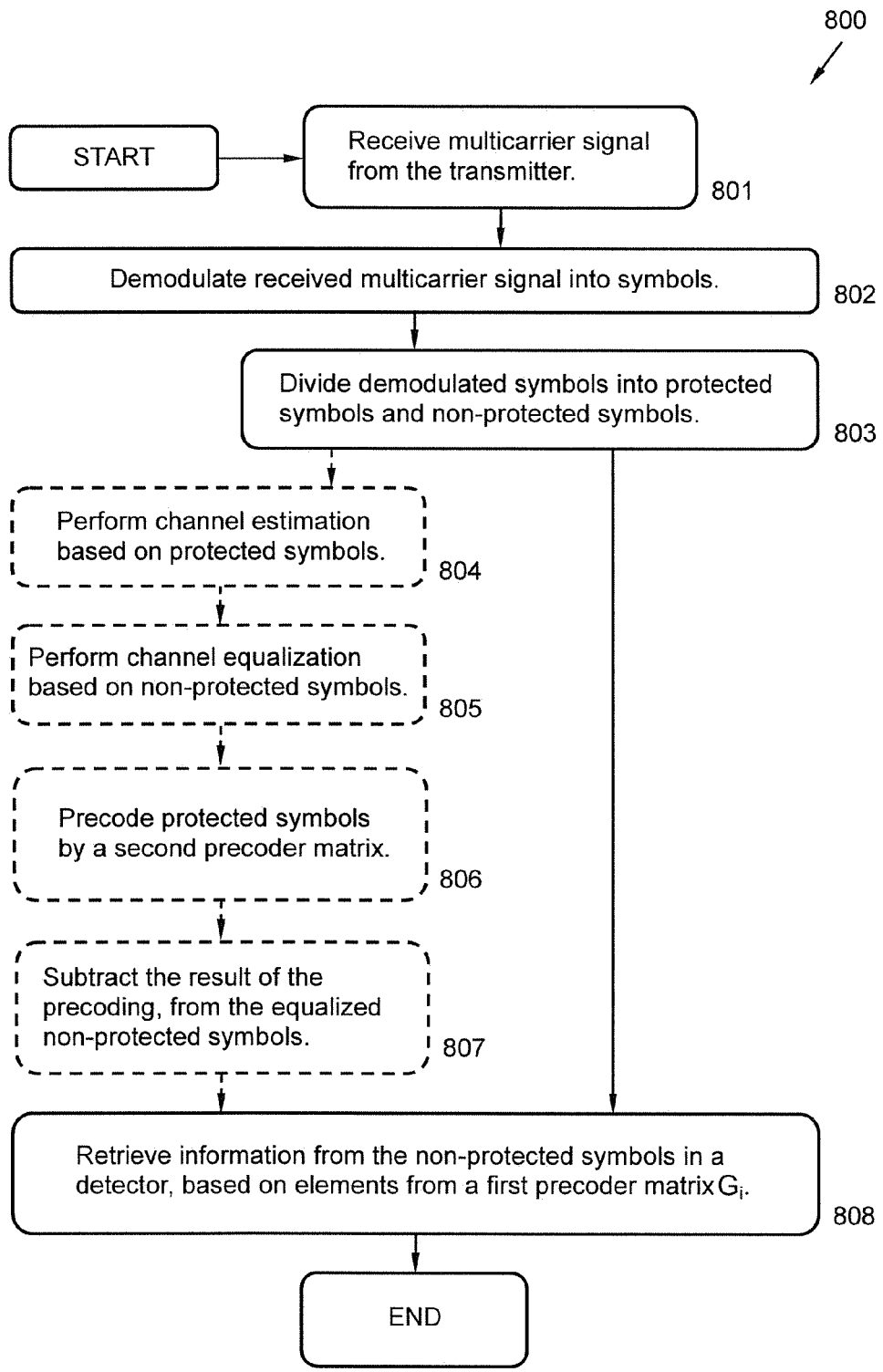
FIG. 8 is a flow chart illustrating a method in a receiver according to an embodiment of the invention.

FIG. 8 is a flow chart illustrating embodiments of a method 800 in a receiver 120, for receiving a multicarrier signal, generated and transmitted by a transmitter 110. The transmitter 110 may be comprised in a wireless communication network 100, which may be based on 3GPP LTE. The receiver 120 may be a UE, or alternatively comprise a radio network node such as an eNodeB according to some embodiments. The transmitter 110 may comprise a radio network node such as an eNodeB according to some embodiments, or alternatively a UE.

To appropriately receive the multicarrier signal, the method 800 may comprise a number of actions 801-808. It is however to be noted that any, some or all of the described actions 801-808, may be performed in a somewhat different chronological order than the enumeration indicates, or even be performed simultaneously. Some actions 801-808 may be performed in reversed order, or simultaneously according to different embodiments. Further, it is to be noted that some actions such as e.g. actions 804-807 may be performed in some alternative embodiments. The method 800 may comprise the following actions:

Action 801

The multicarrier signal is received from the transmitter 110.

Action 802

The received 801 multicarrier signal is demodulated into symbols.

Action 803

The demodulated 802 symbols are divided into protected symbols and non-protected symbols.

The protected symbols may in some embodiments comprise information for allowing the receiver 120 to derive the first precoder matrix $G_i$ and/or the second precoder matrix $G_p$.

Action 804

This action may be comprised within some, but not necessarily all embodiments of the invention.

Channel estimation may be performed based on the protected symbols.

Action 805

This action may be comprised within some, but not necessarily all embodiments of the invention.

Channel equalization may be performed based on the non-protected symbols.

Action 806

This action may be comprised within some, but not necessarily all embodiments of the invention.

Protected symbols may be precoded by a second precoder matrix $G_p$.

Action 807

This action may be comprised within some, but not necessarily all embodiments of the invention comprising actions 805-806.

The result of the precoding 806 may be subtracted from the equalized 805 non-protected symbols.

Action 808

Information is retrieved from the non-protected symbols in a detector 520, based on elements from a first precoder matrix $G_i$.

The information may be retrieved from the non-protected symbols in a first detector 520-1, based on elements from a first precoder matrix $G_i$ and a second precoder matrix $G_p$ according to some embodiments, and wherein information may be retrieved from the protected symbols in a second detector 520-2.

Figure 9:
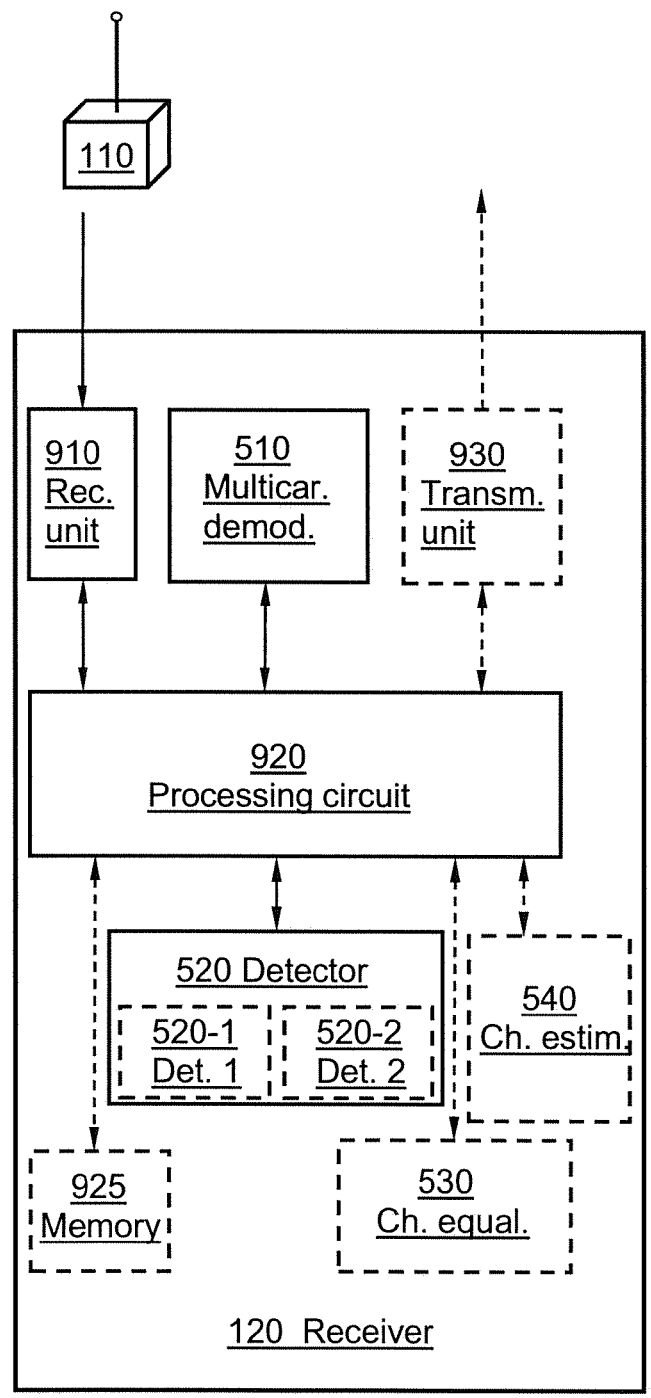
FIG. 9 is a block diagram illustrating a receiver according to an embodiment of the invention.

FIG. 9 is a block diagram illustrating a receiver 120 in a wireless communication network 100. The receiver 120 is configured for receiving wireless signals within the wireless communication network 100, which have been generated and transmitted by a transmitter 110. Further, the receiver 120 is configured for performing the above mentioned method 800 according to any, some or all of the actions 801-808 for receiving a multicarrier signal generated and transmitted by a transmitter 110.

The wireless communication network 100 may be based on 3GPP LTE. The receiver 120 may be a UE, or alternatively comprise a radio network node such as an eNodeB according to some embodiments. The transmitter 110 may comprise a radio network node such as an eNodeB according to some embodiments, or alternatively a UE.

For enhanced clarity, any internal electronics or other components of the receiver 120, not completely indispensable for understanding the herein described embodiments have been omitted from FIG. 9.

The receiver 120 comprises a receiving unit 910. The receiving unit 910 is configured for receiving the multicarrier signal from the transmitter 110.

The receiver 120 also comprises a multicarrier demodulator 510, configured for demodulating the received multicarrier signal into symbols.

Furthermore, the receiver 120 comprises a processing circuit 920. The processing circuit 920 is configured for dividing the demodulated symbols into protected symbols and non-protected symbols.

The processing circuit 920 may comprise, e.g., one or more instances of a CPU, a processing unit, a processing circuit, a processor, an ASIC, a microprocessor, or other processing logic that may interpret and execute instructions. The herein utilised expression "processing circuit" may thus represent a processing circuitry comprising a plurality of processing circuits, such as, e.g., any, some or all of the ones enumerated above.

The processing circuit 920 may further perform data processing functions for inputting, outputting, and processing of data comprising data buffering and device control functions, such as call processing control, user interface control, or the like.

The processing circuit 920 may in some further embodiments be configured for precoding protected symbols by a second precoder matrix $G_p$ and subtracting the result of the precoding from the equalized non-protected symbols.

The processing circuit 920 may be further configured for deriving the first precoder matrix $G_i$ and/or the second precoder matrix $G_p$ from the received protected symbols.

Additionally, the receiver 120 also comprises a detector 520, configured for retrieving information from the non-protected symbols, based on elements from a first precoder matrix $G_i$.

Further, according to some embodiments, the receiver 120 also may comprise a first detector 520-1, configured for retrieving information from the non-protected symbols, based on elements from a first precoder matrix $G_i$ and a second precoder matrix $G_p$; and a second detector 520-2, configured for retrieving information from the protected symbols.

Furthermore, the receiver 120 may comprise a channel estimator 540, configured for channel estimation based on the received and demodulated protected symbols according to some embodiments.

In addition, the receiver 120 also may comprise a channel equalizer 530, configured for channel equalization based on the received and demodulated non-protected symbols.

The previously described actions 801-808 to be performed in the receiver 120 may be implemented through the one or more processing circuits 920 in the receiver 120, together with computer program code for performing the functions of the actions 801-808. Thus a computer program product, comprising instructions for performing the actions 801-808 in the receiver 120 may perform the method 800 for receiving a multicarrier signal, generated and transmitted by a transmitter 110, when the computer program product is loaded in a processing circuit 920 of the receiver 120.

The computer program product mentioned above may be provided for instance in the form of a data carrier carrying computer program code for performing any, at least some, or all of the actions 801-808 according to some embodiments when being loaded into the processing circuit 920. The data carrier may be, e.g., a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the receiver 120 remotely, e.g., over an Internet or an intranet connection.

The terminology used in the detailed description of the invention as illustrated in the accompanying drawings is not intended to be limiting of the described methods 600, 800, transmitter 110 and/or receiver 120, which instead are limited by the enclosed claims.

As used herein, the term "and/or" comprises any and all combinations of one or more of the associated listed items. In addition, the singular forms "a", "an" and "the" are to be interpreted as "at least one", thus also comprising a plurality, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof.

What is claimed is:

1. A method for use in a transmitter for generating a multicarrier signal to be transmitted to a receiver, the method comprising:
    dividing symbols to be transmitted into protected symbols and non-protected symbols;
    precoding non-protected symbols in a first precoder;
    precoding protected symbols in a second precoder;
    creating a modified non-protected symbol vector, based on the precoded non-protected symbols and the precoded protected symbols; and
    modulating the modified non-protected symbol vector and the protected symbols, thereby generating the multicarrier signal.

2. The method according to claim 1, wherein precoding non-protected symbols in the first precoder is made by a first precoder matrix $G_i$ and precoding protected symbols in the second precoder is made by a second precoder matrix $G_p$, wherein the matrices $G_i$, $G_p$ are selected so that the multicarrier signal is generated with a spectrum having an out-of-band emission below a predetermined threshold level.

3. The method according to claim 1, wherein the first precoder and the second precoder are chosen such that:

$$A_i \bar{d}_i + A_p d_p = 0,$$

where $\bar{d}_i$ denotes a modified non-protected symbol vector, $d_p$ denotes a protected symbol vector, and where $A_i$ and $A_p$ are constraint matrices.

4. The method according to claim 1, where a linear combination of the symbols has the form:

$$\bar{d}_i = G_i d_i + G_p d_p,$$

where $\bar{d}_i$ denotes a modified non-protected symbol vector, $d_i$ denotes a non-protected symbol vector, $d_p$ denotes a protected symbol vector, and $G_i$ and $G_p$ are matrices.

5. The method according to claim 3, wherein the matrix $G_p$ has the form:

$$G_p = -A_i^H (A_i A_i^H)^{-1} A_p.$$

6. The method according to claim 3, wherein the matrix $G_i$ has the form:

$$G_i = I - A_i^H (A_i A_i^H)^{-1} A_i.$$

7. The method according to claim 3, wherein the matrix $G_i$ has the form:

$$G_i = [v_0 v_1 \ldots v_{D-P-1}],$$

where constituting column vectors $v_i$ of the matrix $G_i$ span the nullspace of the matrix $A_i$, comprising all vectors x for which $A_i x = 0$.

8. The method according to claim 7, wherein the constituting column vectors $v_i$ of the matrix $G_i$ comprises the last columns of the size matrix $V_i$ in the unique singular-value decomposition of the constraint matrix $A_i$: $A_i = U_i \Sigma_i V_i$.

9. The method according to claim 3, wherein the protected symbols collected in a vector $d_p$ are chosen such that they satisfy the set of linear constraints: $A_p d_p = 0$.

10. The method according to claim 2, wherein the matrix $G_p$ is the zero matrix: $G_p = 0$.

11. The method according to claim 1, wherein the protected symbols to be transmitted comprise any one or more of:
    a pilot signal;
    a reference symbol;
    an information symbol to be transmitted to a legacy receiver; or
    an information symbol carrying side information relating to the precoding.

12. The method according to claim 1, wherein:
    the transmitter comprises: an evolved NodeB (eNodeB) or a User Equipment (UE) in a wireless communication network, based on 3rd Generation Partnership Project Long Term Evolution (3GPP LTE); and
    the receiver comprises a UE or an eNodeB.

13. A transmitter configured for generating a multicarrier signal to be transmitted to a receiver, the transmitter comprising:
    a processing circuit, configured to:
        divide symbols to be transmitted into protected symbols and non-protected symbols, and
        create a modified non-protected symbol vector, based on the precoded non-protected symbols and the precoded protected symbols;
    a first precoder, configured to precode non-protected symbols;
    a second precoder, configured to precode protected symbols; and
    a multicarrier modulator, configured to modulate the modified non-protected symbol vector and the protected symbols, to thereby generate the multicarrier signal to be transmitted.

14. The transmitter according to claim 13, further comprising:
    a transmitting unit, configured to transmit the generated multicarrier signal.

15. A method for use in a receiver for receiving a multicarrier signal generated and transmitted by a transmitter, the method comprising:

receiving the multicarrier signal from the transmitter;

demodulating the received multicarrier signal into symbols;

dividing the demodulated symbols into protected symbols and non-protected symbols; and retrieving information from the non-protected symbols in a detector, based on elements from a first precoder matrix $G_i$.

16. The method according to claim 15, further comprising:

performing channel estimation based on the protected symbols;

performing channel equalization based on the non-protected symbols;

precoding protected symbols by a second precoder matrix $G_p$; and subtracting the result of the precoding from the equalized non-protected symbols.

17. The method according to claim 15, further comprising:

retrieving information from the non-protected symbols in a first detector, based on elements from a first precoder matrix $G_i$ and a second precoder matrix $G_p$; and retrieving information from the protected symbols in a second detector.

18. The method according to claim 15, wherein the protected symbols comprises information for allowing the receiver to derive the first precoder matrix $G_i$ and/or the second precoder matrix $G_p$.

19. A receiver for receiving a multicarrier signal generated and transmitted by a transmitter, the receiver comprising:

a receiving unit, configured to receive the multicarrier signal from the transmitter;

a multicarrier demodulator, configured to demodulate the received multicarrier signal into symbols;

a processing circuit, configured to divide the demodulated symbols into protected symbols and non-protected symbols; and a detector, configured to retrieve information from the non-protected symbols, based on elements from a first precoder matrix $G_i$.

20. The receiver according to claim 19, further comprising:

a channel estimator, configured to channel estimate based on the received and demodulated protected symbols;

a channel equalizer, configured to channel equalize based on the received and demodulated non-protected symbols; and wherein the processing circuit is further configured to precode protected symbols by a second precoder matrix $G_p$ and subtract the result of the precoding from the equalized non-protected symbols.

21. The receiver according to claim 19, further comprising:

a first detector, configured to retrieve information from the non-protected symbols, based on elements from a first precoder matrix $G_i$ and a second precoder matrix $G_p$; and a second detector, configured to retrieve information from the protected symbols.

22. The receiver according to claim 19, wherein the processing circuit is further configured to derive the first precoder matrix $G_i$ and/or the second precoder matrix $G_p$ from the received protected symbols.

* * * * *